US011115442B2

(12) United States Patent
Stephens et al.

(10) Patent No.: US 11,115,442 B2
(45) Date of Patent: Sep. 7, 2021

(54) INITIATING MULTIUSER SESSIONS

(71) Applicant: SONY INTERACTIVE ENTERTAINMENT INC., Tokyo (JP)

(72) Inventors: Mischa Stephens, San Mateo, CA (US); Steven Trombetta, San Mateo, CA (US); Daniel Hiatt, San Mateo, CA (US); Benedikt Neuenfeldt, Tokyo (JP); Atsushi Fuse, Tokyo (JP); Nobukazu Koyama, Tokyo (JP); Shogo Suzuki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/554,375

(22) Filed: Aug. 28, 2019

(65) Prior Publication Data
US 2021/0067566 A1 Mar. 4, 2021

(51) Int. Cl.
*H04L 29/06* (2006.01)
*H04L 29/08* (2006.01)
(52) U.S. Cl.
CPC ........ *H04L 65/1069* (2013.01); *H04L 65/403* (2013.01); *H04L 67/22* (2013.01); *H04L 67/306* (2013.01)
(58) Field of Classification Search
CPC ... H04L 65/1069; H04L 65/403; H04L 67/22; H04L 67/306

(Continued)

(56) References Cited

U.S. PATENT DOCUMENTS

| 10,576,379 B1* | 3/2020 | Wakeford ............... G06F 3/011 |
| 2005/0192097 A1* | 9/2005 | Farnham ............... A63F 13/795 |
| | | 463/42 |

(Continued)

FOREIGN PATENT DOCUMENTS

| WO | WO 2021/041288 | 3/2021 |
| WO | WO 2021/041289 | 3/2021 |

OTHER PUBLICATIONS

Lucero, Andrés, Jussi Holopainen, and Tero Jokela. "MobiComics: collaborative use of mobile phones and large displays for public expression." In Proceedings of the 14th international conference on Human-computer interaction with mobile devices and services, pp. 383-392. 2012. (Year: 2012).*

(Continued)

*Primary Examiner* — Suraj M Joshi
(74) *Attorney, Agent, or Firm* — Polsinelli LLP

(57) ABSTRACT

A system and method for initiating a multiuser session is provided. A plurality of multiuser activities and a plurality of activities templates may be stored in memory. A user profile for a user and a peer profile for each of one or more peers may be received. The user and the one or more peers may be members of an initial session. A user selection specifying one of the filtered multiuser activities may be received. An activity template associated with the selected activity may be retrieved. Such retrieved activity template may provide activity requirements required to launch the selected activity. A multiuser session may be established that includes session requirements based on at least the activity requirements. The user and at least one peer from the initial session may be added to the multiuser session. The selected activity may be launched in the multiuser session.

22 Claims, 6 Drawing Sheets

(58) Field of Classification Search
USPC .......................................... 709/203–205, 217
See application file for complete search history.

(56) References Cited

U.S. PATENT DOCUMENTS

| | | | |
|---|---|---|---|
| 2008/0207315 A1* | 8/2008 | Bloebaum | A63F 13/332 |
| | | | 463/29 |
| 2010/0035691 A1* | 2/2010 | Wild | A63F 13/86 |
| | | | 463/42 |
| 2013/0045804 A1* | 2/2013 | Ruke | A63F 13/323 |
| | | | 463/42 |
| 2013/0310181 A1* | 11/2013 | Kislyi | A63F 13/837 |
| | | | 463/42 |
| 2014/0187314 A1 | 7/2014 | Perry et al. | |
| 2017/0001111 A1 | 1/2017 | Willette et al. | |
| 2017/0106290 A1* | 4/2017 | Pierce | A63F 13/795 |
| 2017/0239564 A1* | 8/2017 | Prakash | A63F 13/35 |
| 2017/0291109 A1* | 10/2017 | Jensen | A63F 13/35 |
| 2019/0201786 A1 | 7/2019 | Muller | |
| 2021/0067833 A1 | 3/2021 | Stephens | |

OTHER PUBLICATIONS

PCT Application No. PCT/US2020/047585 International Search Report and Written Opinion dated Sep. 30, 2020.
PCT Application No. PCT/US2020/047584 International Search Report and Written Opinion dated Nov. 20, 2020.
U.S. Appl. No. 16/554,364 Office Action dated Mar. 17, 2021.

* cited by examiner

INITIATING MULTIUSER SESSIONS

BACKGROUND

1. Field of the Invention

The present technology pertains to multiuser sessions. More specifically, the present technology may provide for activity suggestions for multiuser sessions and initiating multiuser sessions.

2. Description of the Related Art

Multiuser gameplay is a popular and ever-growing segment of gameplay. Multiuser gameplay typically involves users finding a match to a suitable group of peers. Multiuser gameplay may involve social interactions between a user and peers (e.g., friends). Presently available interactions typically occur in a group at a platform level or in a group (e.g., team) within a game. Where a specific group may wish to play together in different games or different sessions, such game group must generally be rebuilt in each different game, which may include different features and parameters depending on each game despite some commonalities between different grouping processes. Further, activities shown to the group may not take into account group statistics and/or size.

Due to the popularity of multiuser games and playing games with a set group of peers (e.g., friends), significant delays and inaccurate or no group activity suggestions can have significant (and negative) impact on user experience. Such group building may, for example, detract from the user experience when grouping processes—which may be repetitive to different extents—cause delay each time the group changes games. Further, such group may wish to play games that each group member may be able to play in.

There is, therefore, a need in the art for systems and methods for proving activity suggestions for multiuser sessions and initiating multiuser sessions.

SUMMARY OF THE PRESENTLY CLAIMED INVENTION

Embodiments of the present invention include systems and methods for initiating a multiuser session is provided. A plurality of multiuser activities and a plurality of activities templates may be stored in memory. Each activity template may be associated with each of the multiuser activities. A user profile for a user and a peer profile for each of one or more peers may be received. The user and the one or more peers may be members of an initial session. The user profile and each of the peer profiles may have information about the user and each peer with respect to each multiuser activity. A user selection from a user device associated with a user may be received. Such user selection may specify one of the filtered multiuser activities. An activity template associated with the selected activity may be retrieved. Such retrieved activity template may provide activity requirements required to launch the selected activity. A multiuser session may be established that includes session requirements based on at least the activity requirements. The user and at least one peer from the initial session may be added to the multiuser session. The selected activity may be launched in the multiuser session.

Various embodiments may include methods for initiating a multiuser session. Such methods may include storing a plurality of multiuser activities and a plurality of activity templates. Each activity template may be associated with each of the multiuser activities. Such methods may include receiving a user profile for a user and a peer profile for each of one or more peers. The user profile and each of the peer profiles may have information about the user and each peer with respect to each multiuser activity. The user and the one or more peers may be members of an initial session. Such methods may include filtering the plurality of multiuser activities based on the user profile. Such methods may include receiving a user selection from a user device associate with the user, the user selection specifying one of the filtered multiuser activities. Such methods may include retrieving an activity template associated with the selected activity. The retrieved activity template may provide activity requirements required to launch the selected activity. Such methods may include establishing a multiuser session having session requirements based on at least the activity requirements provided by the retrieved activity template. Such methods may include adding the user and at least one peer from the initial session to the multiuser session. Such methods may include launching the selected activity in the multiuser session.

Additional embodiments may include systems for initiating a multiuser session. Such systems may include memory that stores a plurality of multiuser activities and a plurality of activity templates. Each activity template may be associated with each of the multiuser activities. Such systems may include a network interface that establishes a session with a user device associated with the user over a communication network. Such systems may include a processor that executes instructions stored in memory. Execution of the instructions by the processer may receive a user profile for a user and a peer profile for each of one or more peers. The user profile and each of the peer profiles may have information about the user and each peer with respect to each multiuser activity. The user and the one or more peers may be members of an initial session. Execution of the instructions by the processer may filter the plurality of multiuser activities based on the user profile. Execution of the instructions by the processer may receive a user selection from the user specifying one of the filtered multiuser activity. Execution of the instructions by the processer may retrieve an activity template associated with the selected activity. The retrieved activity template may provide activity requirements required to launch the selected activity. Execution of the instructions by the processer may establish a multiuser session having session requirements based on at least the activity requirements provided by the retrieved activity template. Execution of the instructions by the processer may add the user and at least one peer from the initial session to the multiuser session. Execution of the instructions by the processer may launch the selected activity in the multiuser session.

Further embodiments include non-transitory computer-readable storage media having embodied thereon a program executable by a processor to initiate a multiuser session.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for initiating a multiuser session. A plurality of multiuser activities and a plurality of activities templates may be stored in memory. A user profile for a user and a peer profile for each of one or more peers may be received. The user and the one or more peers may be members of an initial session. A user selection specifying one of the filtered multiuser activities may be received. An activity template associated with the selected activity may be retrieved. Such retrieved activity template may provide activity requirements required to launch the selected activity. A multiuser session may be established that includes session requirements based on at least the activity requirements. The user and at least one peer from the initial session may be added to the multiuser session. The selected activity may be launched in the multiuser session.

Figure 1:
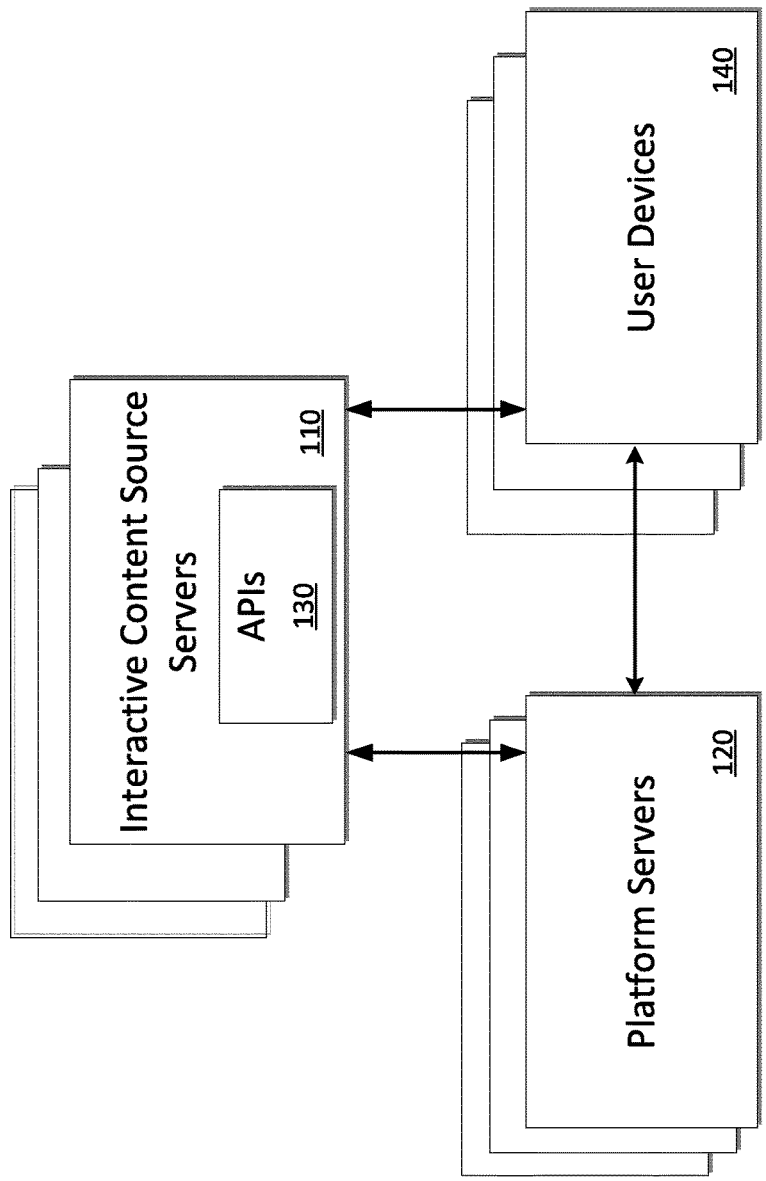
FIG. 1 illustrates an exemplary network environment in which a system for initiating multiuser sessions may be implemented.

FIG. 1 illustrates an exemplary network environment 100 in which a system for establishing and managing multiuser lead sessions can occur. The network environment 100 may include one or more interactive content source servers 110 that provide interactive content (e.g., video games, interactive video, etc.), platform servers 120, and one or more user devices 140.

Interactive content source servers 110 may maintain and host interactive content titles available for play to a user device 140 over a communication network. Such interactive content servers 110 may be implemented in the cloud (e.g., one or more cloud servers). Each interactive content title may include one or more activities available within the content title. The one or more activities may be playable by a single user or by multiple users. Each interactive content title may include one or more templates corresponding to one or more activities available within the content title. Each template may provide a structured data set regarding the corresponding activities and that may be used as the basis for tracking and displaying information regarding the corresponding activities in real-time. Each template may also provide data regarding establishing a lead session for multiuser interactions and for participation in multiple interactive contents as a single lead session. Such lead session may be implemented at the interactive content source servers 110 and/or the platform servers 120.

In one example, the interactive content title is a video game title, and the one or more templates may correspond to different modes of competitive gameplay available within that game title. In another example, the one or more templates may correspond to different chapters of an interactive storyline. Each template may be associated with a portion of the interactive content title where the corresponding activity starts within the interactive content title. For example, the template may include a waypoint within a portion of a game (e.g., at a specific game environment location at a specific point in time in the game storyline) where an activity starts. In another example, the template may virtually teleport a character of the user to the location within the game environment that is closest to the start of the associated activity. The template may also be associated with establishing a lead session to group users for participation in the associated activity and to provide group management. Such template associated with the lead session may further provide activity requirements (e.g., number of players maximum and/or minimum, skill level and/or rank, character level and/or rank, user device requirements, etc.) required to launch the selected activity (e.g., competitive match). Each template may be updated, edited, or removed, or new templates may be created. The one or more templates may be stored at the interactive content source servers 110 or at platform server 120 and retrieved therefrom.

The platform servers 120 may be responsible for communicating with the different interactive content source servers 110 in order to establish and manage a lead session or a social session. Such platform servers 120 may be implemented on one or more cloud servers. The interactive content source servers 110 may communicate with multiple platform servers 120. The platform servers 120 may also carry out instructions, for example, for storing a plurality of multiuser activities and a plurality of activity templates. Each activity template may be associated with each of the multiuser activities. The platform servers 120 may further carry out instructions, for example, for receiving a user profile for a user and a peer profile for each of one or more peers. Such user profile and each of the peer profiles may have information about the user and each peer with respect to each multiuser activity. Such user and the one or more peers may be members of an initial session (e.g., a social session, a multiuser session, a lead session, or an activity session). The platform servers 120 may further carry out instructions, for example, for filtering the plurality of multiuser activities based on the user profile. The platform servers 120 may further carry out instructions, for example, receiving a user selection from a user device associate with the user, the user selection specifying one of the filtered multiuser activities. The platform servers 120 may further carry out instructions, for example, for retrieving an activity template associated with the selected activity. Such retrieved activity template may provide activity requirements required to launch the selected activity. The platform servers 120 may further carry out instructions, for example, for establishing a multiuser session having session requirements based on at least the activity requirements provided by the retrieved activity template. The platform servers 120 may further carry out instructions, for example, for adding the user and at least one peer from the initial session to the multiuser session. The platform servers 120 may further carry out instructions, for example, for launching the selected activity in the multiuser session.

The interactive content titles and their corresponding activities may be provided through an application programming interface (API) 130, which allows various types of interactive content source servers 110 to communicate with different platform servers 120 and different user devices 140. API 130 may be specific to the particular computer programming language, operating system, protocols, etc., of the interactive content source servers 110 providing the interactive content titles, the platform servers 120 providing the associated templates, and user devices 140 receiving the same. In a network environment 100 that includes multiple different types of interactive content source servers 110 (or platform servers 120 or user devices 140), there may likewise be a corresponding number of APIs 130.

The user device 140 may include a plurality of different types of computing devices. For example, the user device 140 may include any number of different gaming consoles, mobile devices, laptops, and desktops. Such user devices 140 may also be configured to access data from other storage media, such as, but not limited to memory cards or disk drives as may be appropriate in the case of downloaded services. Such devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 6.

Figure 2:
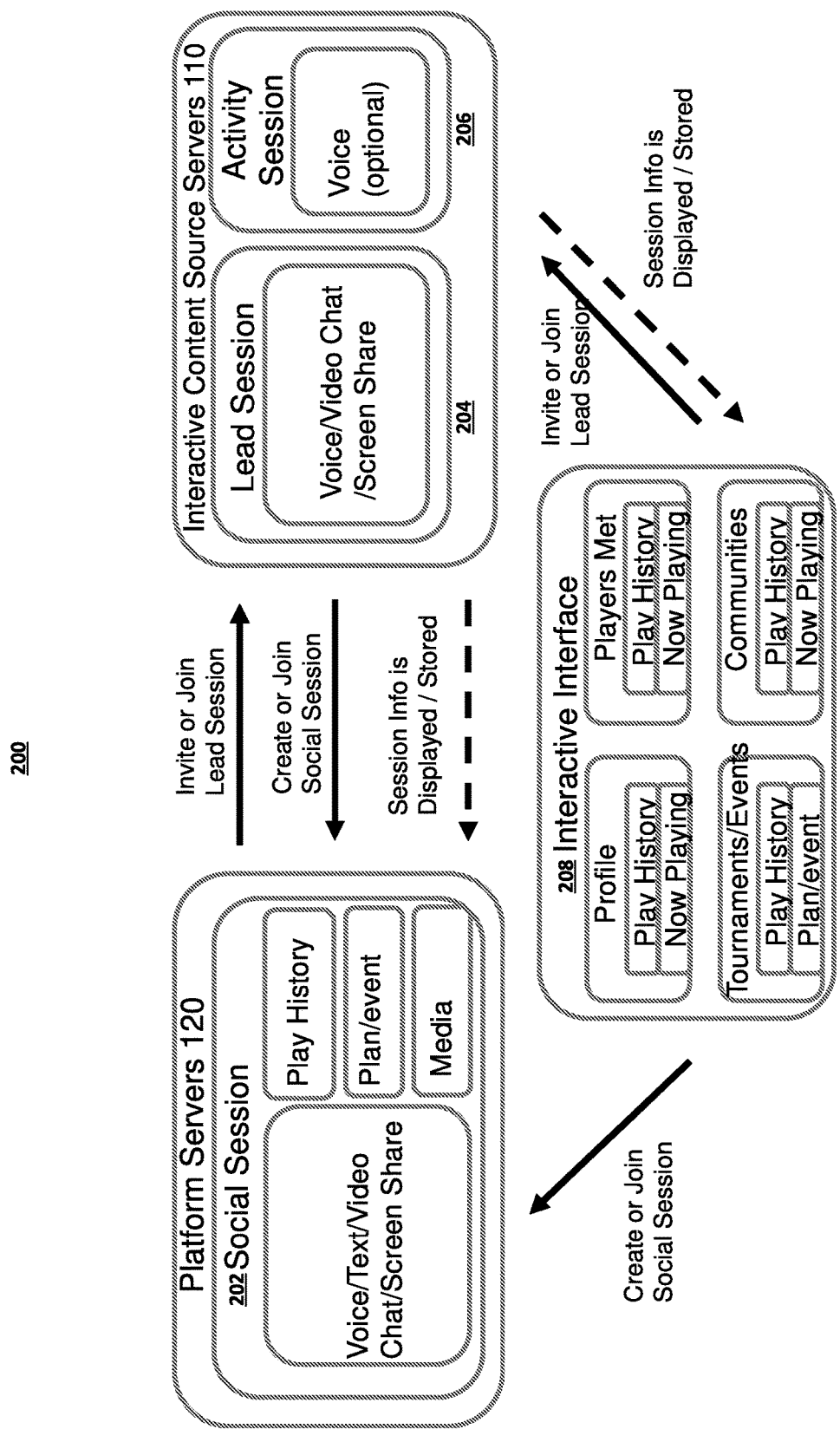
FIG. 2 illustrates a detailed exemplary network in which a system for initiating multiuser sessions may be implemented.

In the exemplary network environment 200 of FIG. 2, an exemplary social session 202, an exemplary lead session 204, an exemplary activity session 206, and an exemplary interactive interface 208 are illustrated. A social session 202 may be established without an activity selection or without an activity template. Such social session 202 may be created at the platform server 120 by a user to group the user and peers (e.g., friends) together prior to an activity selection and to provide communication (e.g., voice chat, video chat, text chat, screen sharing, etc.) to the social session. A user of the social session 202 may receive an invitation to join a peer in an established lead session 204 to participate in an activity selected by the peer. A user of the social session 202 may also create a lead session 204 and invite peers to join such lead session 204. Activities that the social session 202 may qualify for may be displayed on the interactive interface 208 to each of the user and the peers of the social session 202 for selection.

An exemplary lead session 204 may be established on the interactive content source servers 110 when a user selects an activity to participate in. Such lead session 204 may include lead session properties. The lead session properties may be based on at least the activity properties and/or user preferences (e.g., limiting lead session to certain peers setting the lead session to private and/or by invite only, requiring a skill level to join, etc.). The lead session 204 may further include a plurality of participant slots. Such participant slots may be based on the minimum and/or maximum number of players that can participate in the selected activity. Each participant slot may be occupied by a participant (e.g., a user or peer). Such participant may be required to satisfy the lead session properties to occupy a slot. For example, the lead session property may require a certain skill level to join, and the participant may possess such skill level, thereby allowing the participant to join the lead session and occupy a participant slot.

The lead session 204 may further include one or more spectator slots. Such spectator slots correspond to slots for viewing the activity during the lead session 204 interaction with the activity on spectator devices. The spectator slots may be restriction by some or all of the lead session properties (e.g., hardware and/or software requirements) or the spectator slots may not be restricted. Such spectator slots may not be added or generated until the selected activity has begun.

The lead session 204 can further include lead session history. Such lead session history may be based on past activities completed by the lead session and may include lead session data corresponding to each past activity (e.g., achievements and/or trophies earned by the lead session, activity run time, statistics related to the performance of the lead session in the activity, activity results, past leaders, past peers, etc.). Such lead session history may be displayed on an interactive interface of the user device 140 as part of a user profile or part of a session profile. Such lead session history can allow a former leader or peer to re-establish the session based on the lead session history. Such re-established lead session can include the same lead session properties previously established for the past lead session.

An exemplary activity session 206 may be established on the interactive content source servers 110 for the duration of a selected activity if a lead session 204 is lacking the required number of participants for the selected activity. Such activity session 206 may join the leader and peers of the lead session 204 to the activity session 206 and also join another lead session 204 or individual peers (e.g., peers not part of a lead session) to the activity session 206 until the activity requirements for the selected activity are fulfilled. For example, an activity may require twelve participants and a first lead session and a second lead session having six participants may be joined in an activity session. 206 After the selected activity is completed, the activity session 206 ends.

The leader and peers may remain in the lead session 204, while participating in the activity session 206. In other words, the lead session 204 remains intact during participation by the leader and the peers in the selected activity and the leader and the peers are simultaneous members of the lead session 204 and the activity session 206. As such, the lead session 204 persists during and after the selected activity ends. Further, if the lead session 204 has open participant slots or open spectator slots, other peers may join the lead session 204 during an active activity. For example, while the leader and the current peers are participating in an activity, another peer can join the lead session 204 and can spectate or wait until the leader and the current peers complete the activity. In the same example, the other peer can join the activity if one of the leader or the current peers leaves the activity. Alternatively, the leader and the current peers may be added to the activity session 206, and a placeholder may be established in the lead session 204 for each leader and peer until the activity is completed.

From either an established lead session 204 and/or an activity session, a user can join an established social session 202 or create a social session 202. Further, session data related to activity session may be stored at the platform servers 120 and/or displayed at a social session 202 and/or on an interactive interface 208.

An interactive interface 208 can be established by the platform servers 120 and can be displayed on the user devices 140. Such interactive interface 208 may display available activities, user and/or peer data (e.g., current profile, past history, etc.), or available lead sessions 204 to join. Such interactive interface 208 may also allow a user to create a social session 202, join an established social session 202, create a lead session 204 and invite peers, or join an existing lead session 204.

The interactive interface 208 may also be displayed on a mobile device. Such interactive interface 208 may receive an invitation to a user of the mobile device to join an activity and maybe display corresponding mobile actions of attending or not attending. Selection of attending may trigger the mobile device to send instructions to a console associated with the mobile device to send a message to sender of the invitation and/or members of the session associated with the activity. Such message may indicate that the user will join the session when the user is online and may include an estimated time of the user's arrival. The mobile device may send further instructions to the console to display and/or update the estimated time that the user may join the session. The mobile device may also send instructions to the console to add the user to the session, such that when the user comes online the user will be able to immediately interact with the session and/or the activity. Selection of not attending may trigger the mobile device to send instructions to the console to send a different message to sender of the invitation and/or members of the session associated with the activity. Such different message may indicate that the user will not join the session. Selection of not attending may occur when the initial invitation is received or after the user has already selected attending. In other words, the user may change the user's selection from attending to not attending.

Figure 3:
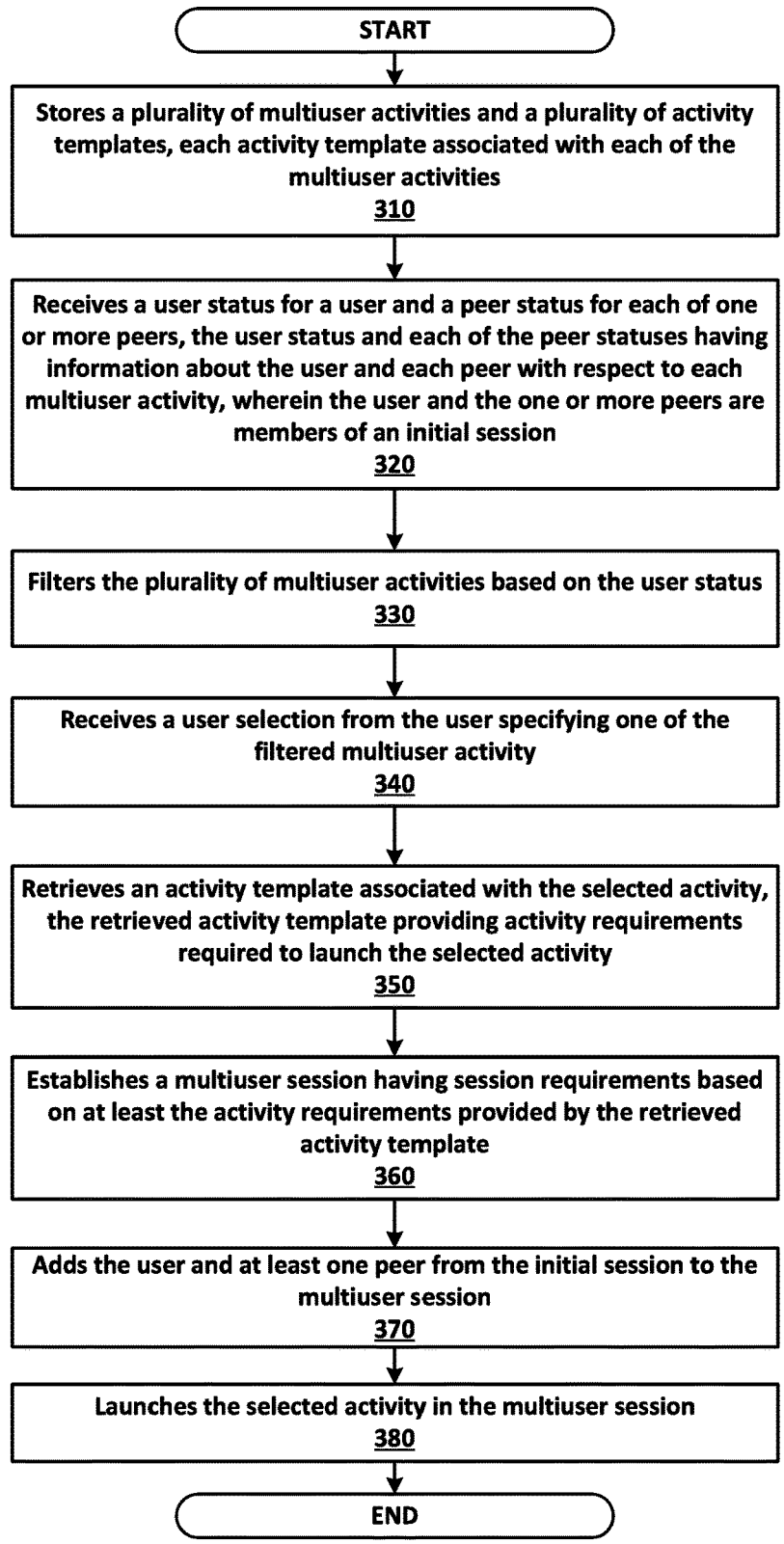
FIG. 3 is a flowchart illustrating an exemplary method for initiating multiuser sessions.

FIG. 3 is a flowchart illustrating an exemplary method 300 for providing activity suggestions to an initial session (e.g. a social session, a lead session, or an activity session) and initiating multiuser sessions. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, a plurality of multiuser activities and a plurality of activity templates are stored by the platform servers 120 or the interactive content source servers 130. Each activity template may be associated with each of the multiuser activities.

In step 320 a user profile for a user and a peer profile for each of one or more peers may be received by the platform servers 120 or the interactive content source servers 130. The user and each of the one or more peers may be members of an initial session (e.g., a social session, a multiuser session, a lead session, or an activity session). Such user profile and each of the peer profiles may have information about the user and each peer with respect to each multiuser activity. For example, the user profile and each peer profile may include whether the user and each peer has access to each multiuser activity, a skill level and/or experience level of the user and each peer, and/or whether the user and each peer have downloaded each multiuser activity.

In step 330, the plurality of multiuser activities is filtered by the platform servers 120 or the interactive content source servers 130 based on the user profile. Such user profile may include user data (e.g., user skills, character levels and/or skills, hours played, type of games played, etc.), data regarding an associated user device (e.g., hardware components and capabilities, software, router information, geolocation etc.), and/or user device peripherals (e.g., microphone, camera, mouse, controller, devices, etc.). For example, the plurality of multiuser activities may be filtered based on whether the user has access to certain activities, the user history, and/or available playtime of the user. In the same example, the plurality of multiuser activities may be filtered for a peer based on the peer profile and as such, the filtered multiuser activities is different for each of the peer and the user.

Filtering the plurality of multiuser activities may be further based on the peer profile and/or a group profile. Each of the peer profiles, group profile, and/or user profile may be stored in memory. Such peer profile may include peer data (e.g., peer skills, character levels and/or skills, hours played, type of games played, etc.), data regarding an associated peer device (e.g., hardware components and capabilities, software, router information, geolocation etc.), and/or peer device peripherals (e.g., microphone, camera, mouse, controller, devices, etc.). Such group profile may include activities played by the group, play time for each activity, number of members, average skill level and/or experience level of the group for each activity, whether each member has access to and/or has downloaded each activity, whether the user and each peer satisfies activity requirements associated with each activity, and/or total play time of the group. For example, the plurality of multiuser activities may be filtered based on number of members within a group and whether each member (i.e., the user and each peer) has access to an activity.

In step 340, a user selection is received from a user device associated with the user by the platform servers 120 or the interactive content source servers 110. Such user selection may specify a multiuser activity (e.g., a dungeon, multi-user quest, competitive match, etc.) associated with an interactive content title. Such user selection may be based on voting or polling by the one or more peers. Such user selection may be received when the user is in any session (e.g., a social session, a multiuser session, a lead session, or an activity session).

In step 350, an activity template associated with the selected activity is retrieved by the platform servers 120 or the interactive content source servers 110. Such activity template may include activity requirements required to launch the selected activity. Such activity requirements may regard hardware, software, user, and/or peer requirements in addition to maximum and/or minimum numbers of users required to begin the activity.

In step 360, a multiuser session (e.g., a lead session 204 and/or an activity session 206) may be established by the platform servers 120 or the interactive content source servers 110. The multiuser session may have session requirements that are based on at least the activity requirements provided by the retrieved activity template. For example, the activity requirements—and subsequently the session requirements—may require four users each using a certain user device (e.g., Sony PlayStation®). For example, a session requirement may require that peer characters either match or exceed a user character's level. In another example, the session requirement may require that a user device be capable of performing host duties, which may be indicated by the user profile as to user device capabilities.

In step 370, the user and at least one peer from the initial session (e.g., a social session, a multiuser session, a lead session, or an activity session) may be added to the multiuser session by the platform servers 120 or the interactive content source servers 110. Adding the user device and at least one peer device to the multiuser session may include inviting each peer to the multiuser session and adding each peer when the peer accepts the invitation. Each of the user device and the at least one peer device may be added if each device currently has access to the selected activity (e.g., owns, demos, has a pass, or the like).

A notification including an invitation may be sent to each of the user and each peer. The notification may include an action button (e.g., buy, join, spectate, or demo) based on the user status or each of the peer status. For example, if the user status indicates that the user has access to the activity, a join action button may be displayed to the user. Selection of the join action button will add the user to the multiuser session. In another example, if the user status and/or peer status indicates that the user does not have access to the activity, a buy, spectate, or demo action button may be displayed to the user or peer. Selection of the buy action button may provide an option to purchase the activity by the user or peer; the spectate action button may add the user or peer to a spectator slot of the multiuser session; and the demo action button may provide a demo for the user or peer to play and may add the user or peer to the multiuser session. The user or the peer may then be added to the multiuser session when the user or the peer gains access to the activity (e.g., purchases or demos the activity).

Figure 4A:
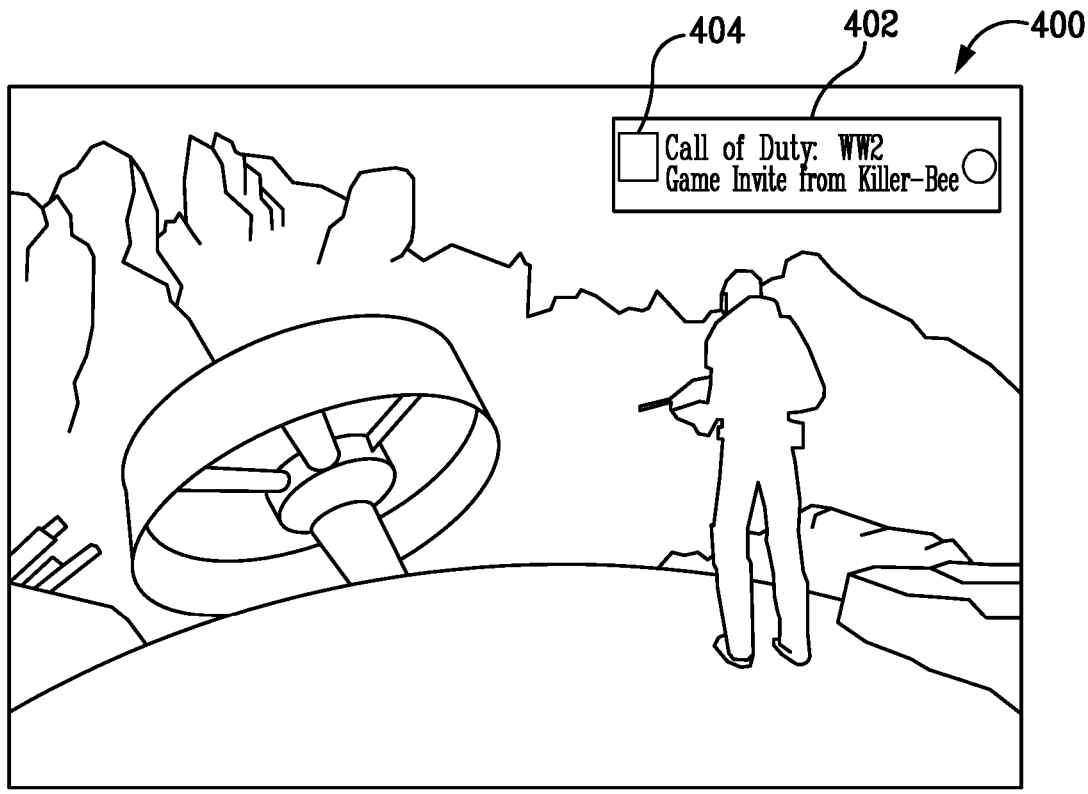
FIGS. 4A-4B illustrates an exemplary invitation and details of the exemplary invitation, respectively.
Figure 4B:
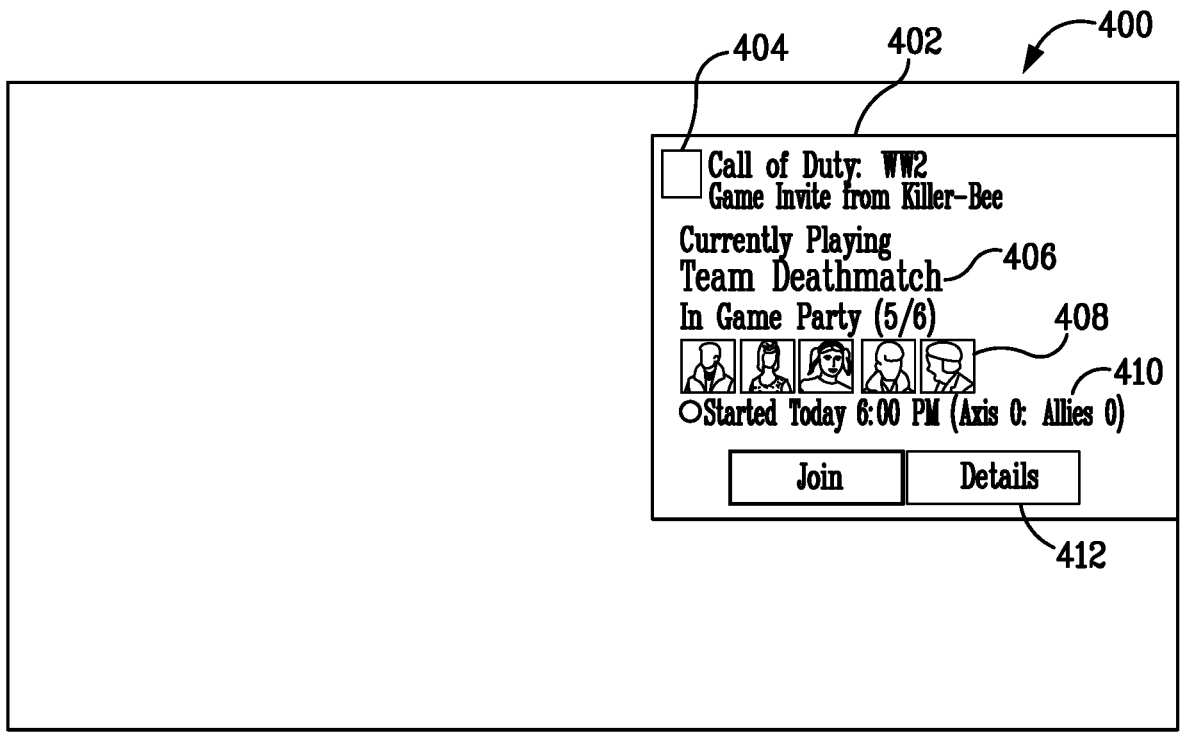

In one exemplary example, shown in FIG. 4A-B, an invitation 402 is displayed within a gaming screen 400. The invitation 402 may be displayed at any time, such as when the user is in an activity, a group chat, a social session, a lead session, or an activity session. The invitation 402 may initially include a title of the activity and a sender of the invitation 402 and may further display an activity type 406, current members of an existing session 408, and a join or details button 412. Selection of the join button 412 will add the user to the existing session 408 and selection of the details button 412 will display further details concerning the activity.

Figure 5A:
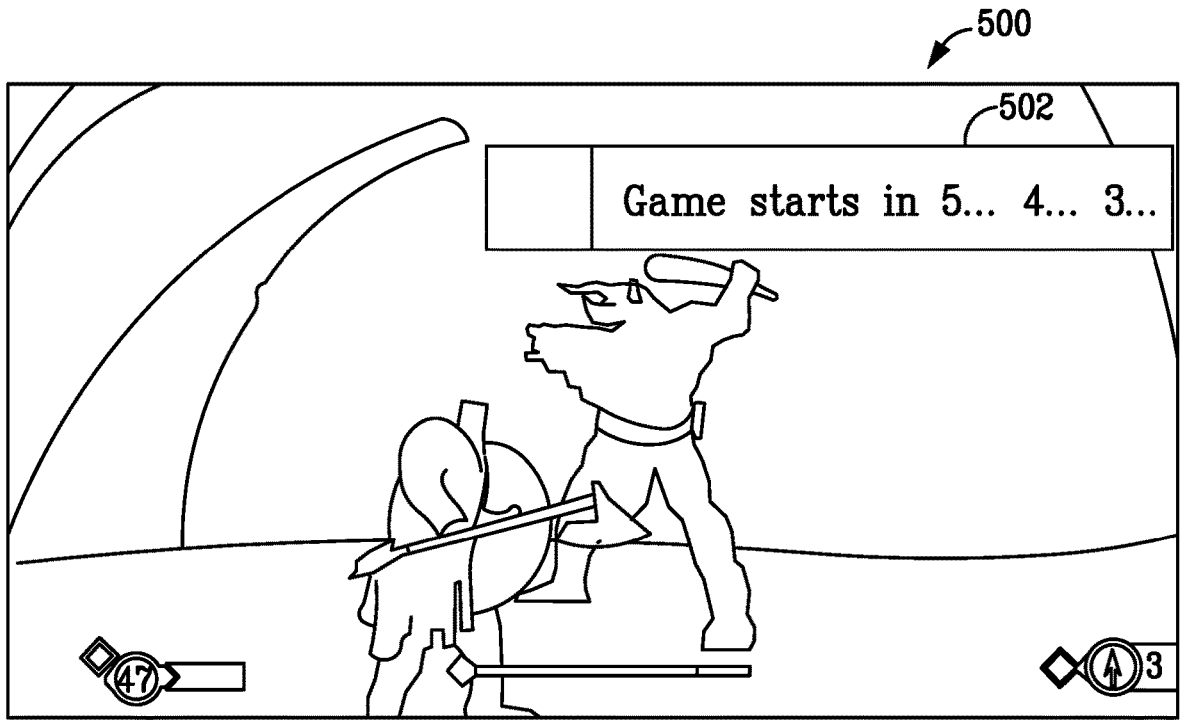
FIGS. 5A-5B illustrates an exemplary auto-invitation and initiation of the auto-invitation, respectively.
Figure 5B:
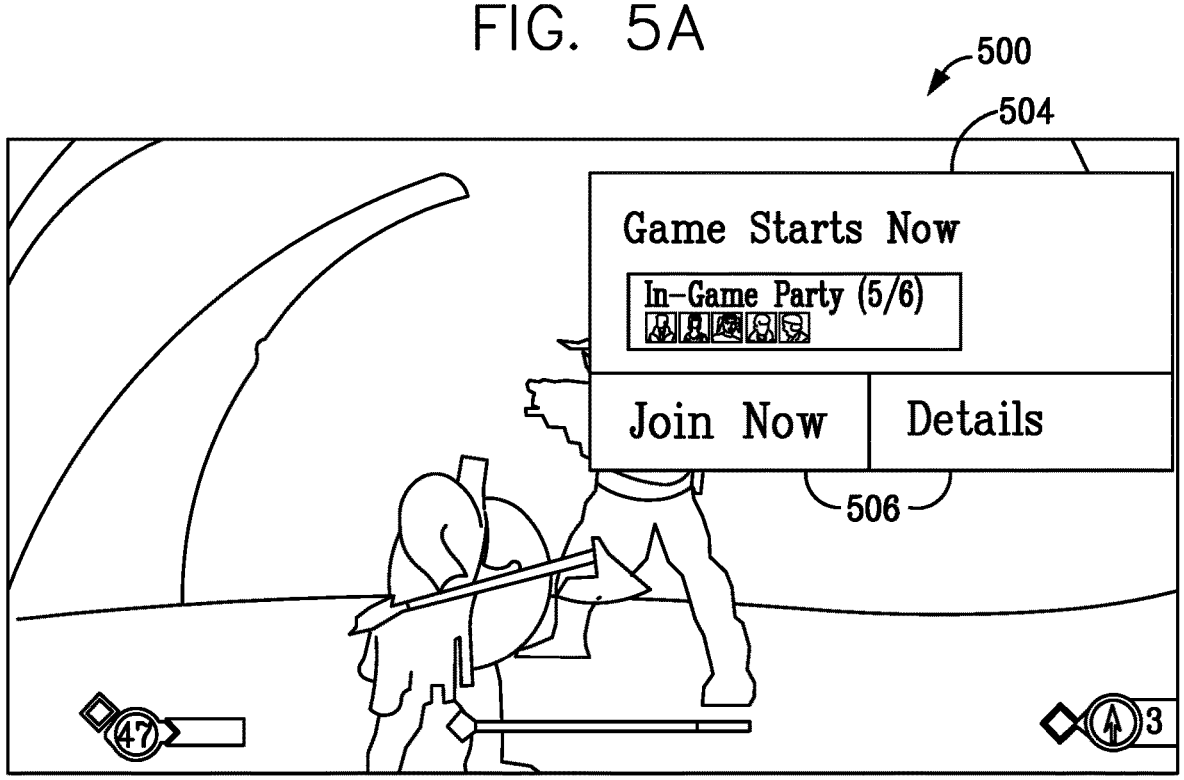

The user and each peer of the initial session may further be automatically added to the multiuser session by an auto-invitation, shown in FIG. 5A-B. An auto-invitation 502 may be displayed on a gaming screen 500. The auto-invitation 502 may be displayed at any time, such as when the user is in an activity, a group chat, a social session, a lead session, or an activity session. The auto-invitation 502 may indicate that the activity is starting and may add the user to the multiuser session of the activity if the user does not opt out of the auto-invitation 502. In this example, the user may opt out by selection of the auto-invitation 502, though the user may opt out in other ways (e.g., voice selection, texting an opt out text, etc.). Selection of the auto-invitation 502 will then open an invitation 506 that may include action buttons, such as a join or details button 506. Selection of the join button 506 will add the user to the existing session and selection of the details button 506 will display further details concerning the activity.

In step 350, the selected activity may be launched in the multiuser session by the platform servers 120 or the interactive content source servers 110. The multiuser session can provide further communication between the users (e.g., voice chat, direct messaging, text chat, screen sharing, video chat, etc.) during interaction with the activity. After the interaction with the selected activity has ended or been completed, the existing multiuser session can persist after leaving the activity. In other words, the participants of the multiuser session can remain together even after the selected activity has ended.

Multiuser sessions and activity suggestions provided to such multiuser sessions described allow a group of user and peers to interact with each other and to enter multiuser activities together without losing members or having to recreate the group. Further, such groups can be maintained when one or more peers may not have access to a selected activity by granting temporary access or removing such peers, thereby allowing the group of user and peers to maintain interaction with each other through multiple activities and periods between activities.

Figure 6:
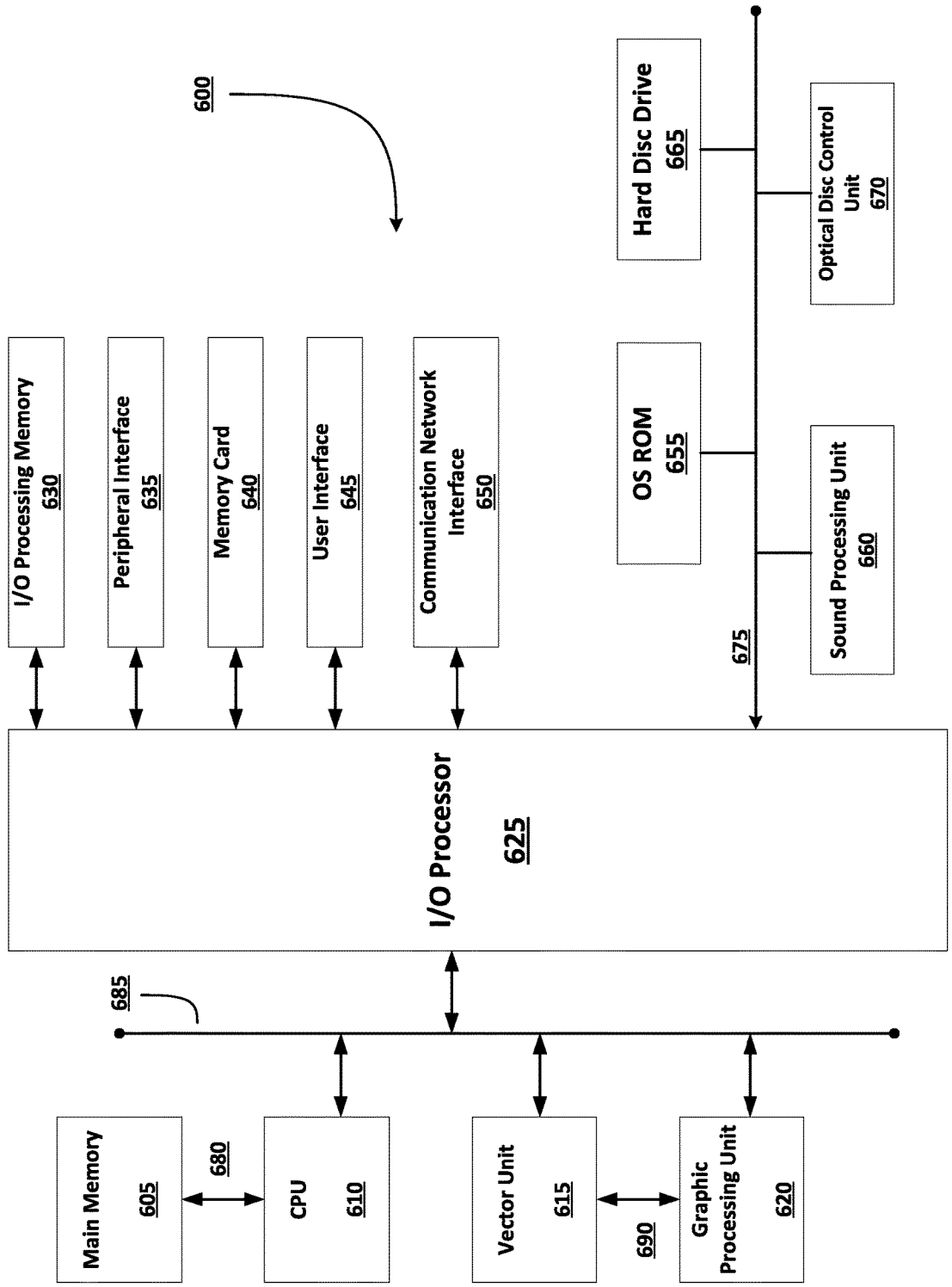
FIG. 6 is an exemplary electronic entertainment system that may be used in initiating multiuser sessions.

FIG. 6 is an exemplary user electronic entertainment system that may be used in launching interactive content and providing dynamic interfaces. The entertainment system 600 of FIG. 6 includes a main memory 605, a central processing unit (CPU) 610, vector unit 615, a graphics processing unit 620, an input/output (I/O) processor 625, an I/O processor memory 630, a peripheral interface 635, a memory card 640, a Universal Serial Bus (USB) interface 645, and a communication network interface 650. The entertainment system 600 further includes an operating system read-only memory (OS ROM) 655, a sound processing unit 660, an optical disc control unit 670, and a hard disc drive 665, which are connected via a bus 675 to the I/O processor 625.

Entertainment system 600 may be an electronic game console. Alternatively, the entertainment system 600 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 610, the vector unit 615, the graphics processing unit 620, and the I/O processor 625 of FIG. 6 communicate via a system bus 685. Further, the CPU 610 of FIG. 6 communicates with the main memory 605 via a dedicated bus 680, while the vector unit 615 and the graphics processing unit 620 may communicate through a dedicated bus 690. The CPU 610 of FIG. 6 executes programs stored in the OS ROM 655 and the main memory 605. The main memory 605 of FIG. 6 may contain pre-stored programs and programs transferred through the I/O Processor 625 from a CD-ROM, DVD-ROM, or other optical disc (not shown) using the optical disc control unit 670. I/O Processor 625 of FIG. 6 may also allow for the introduction of content transferred over a wireless or other communications network (e.g., 4G, LTE, 1G, and so forth). The I/O processor 625 of FIG. 6 primarily controls data exchanges between the various devices of the entertainment system 600 including the CPU 610, the vector unit 615, the graphics processing unit 620, and the peripheral interface 635.

The graphics processing unit 620 of FIG. 6 executes graphics instructions received from the CPU 610 and the vector unit 615 to produce images for display on a display device (not shown). For example, the vector unit 615 of FIG. 6 may transform objects from three-dimensional coordinates to two-dimensional coordinates, and send the two-dimensional coordinates to the graphics processing unit 620. Furthermore, the sound processing unit 660 executes instructions to produce sound signals that are outputted to an audio device such as speakers (not shown). Other devices may be connected to the entertainment system 600 via the USB interface 645, and the communication network interface 650 such as wireless transceivers, which may also be embedded in the system 600 or as a part of some other component such as a processor.

A user of the entertainment system 600 of FIG. 6 provides instructions via the peripheral interface 635 to the CPU 610, which allows for use of a variety of different available peripheral devices (e.g., controllers) known in the art. For example, the user may instruct the CPU 610 to store certain game information on the memory card 640 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for initiating a multiuser session, the method comprising:
   storing a plurality of multiuser activities and a plurality of activity templates, each activity template associated with each of the multiuser activities, each activity template associated with a portion of an interactive content title;
   receiving a user profile for a user and a peer profile for each of one or more peers, the user profile and each of the peer profiles having information about the user and each peer with respect to each multiuser activity, wherein the user and the one or more peers are members of an initial session initiated by a platform server;
   filtering the plurality of multiuser activities based on the user profile during the initial session initiated by the platform server;
   receiving a user selection during the initial session initiated by the platform server, the user selection from the user specifying one of the filtered multiuser activities, wherein a retrieved activity template associated with the selected activity provides activity requirements required to launch the selected activity;
   establishing a multiuser session with at least one of the peers from the initial session in response to the user selection, the multiuser session established by an interactive content server in accordance with session requirements that include at least the activity requirements provided by the retrieved activity template; and
   launching the selected activity in the multiuser session established by the interactive content server, the selected activity launched with the at least one peer.

2. The method of claim 1, wherein establishing the multiuser session includes inviting each peer to the multiuser session, and adding each peer to the multiuser session when the peer accepts the invitation.

3. The method of claim 2, wherein the peer accepts the invitation by selecting at least one of a spectate action and a join action, wherein the peer is added to a player slot of the multiuser session when the peer selects the join action, and wherein the peer is added to a spectator slot of the multiuser session when the peer selects the spectate action.

4. The method of claim 1, wherein establishing the multiuser session includes auto-inviting each peer to the multiuser session, the auto-inviting including an option to opt out, and adding each peer to the multiuser session when the peer does not select to opt out.

5. The method of claim 1, further comprising:
   generating a notification to one or more peers that do not have access to the selected activity, the notification providing an option to obtain access to the selected activity;
   receiving a selection to obtain access to the selected activity from the one or more peer; and
   adding the one or more peers to the multiuser session.

6. The method of claim 5, wherein the notification providing the option to obtain access to the selected activity includes at least one option of purchasing the selected activity or demoing the selected activity.

7. The method of claim 1, wherein the user profile includes multiuser activities available to the user and each peer profile includes multiuser activities available to each peer, and wherein filtering the multiuser activities is based on one or more multiuser activities that are available to the user and each peer.

8. The method of claim 1, wherein filtering the multiuser activities is based on at least one of a skill level of the user and each of the one or more peers.

9. The method of claim 1, wherein filtering the multiuser activity is further based on each peer profile.

10. The method of claim 9, further comprising:
    adding a new peer to the initial session, the new peer having a new peer profile; and
    re-filtering the multiuser activities based on the user profile, each peer profile, and the new peer profile.

11. The method of claim 1, wherein the initial session is one of a social session or another multiuser session.

12. A system for initiating a multiuser session, the system comprising:
    memory that stores a plurality of multiuser activities and a plurality of activity templates, each activity template associated with each of the multiuser activities, each activity template associated with a portion of an interactive content title;

a network interface that establishes a session with a user device associated with a user over a communication network; and a processor that executes instructions stored in memory, wherein execution of the instructions by the processor:

receives a user profile for a user and a peer profile for each of one or more peers, the user profile and each of the peer profiles having information about the user and each peer with respect to each multiuser activity, wherein the user and the one or more peers are members of an initial session initiated by a platform server;

filters the plurality of multiuser activities based on the user profile;

receives a user selection during the initial session initiated by the platform server, the user selection from the user specifying one of the filtered multiuser activities, wherein a retrieved activity template associated with the selected activity provides activity requirements required to launch the selected activity;

establishes a multiuser session with at least one of the peers from the initial session in response to the user selection, the multiuser session established by an interactive content server in accordance with session requirements that include at least the activity requirements provided by the retrieved activity template; and launches the selected activity in the multiuser session established by the interactive content server, the selected activity launched with the at least one peer.

13. The system of claim 12, wherein the processor establishes the multiuser session by inviting each peer to the multiuser session, and adding each peer to the multiuser session when the peer accepts the invitation.

14. The system of claim 13, wherein the peer accepts the invitation by selecting at least one of a spectate action and a join action, wherein the processor adds the peer to a player slot of the multiuser session when the peer selects the join action, and wherein the processor adds the peer to a spectator slot of the multiuser session when the peer selects the spectate action.

15. The system of claim 12, wherein the processor establishes the multiuser session by auto-inviting each peer to the multiuser session, the auto-inviting including an option to opt out, and adding each peer to the multiuser session when the peer does not select to opt out.

16. The system of claim 12, wherein the processor executes further instructions to:

generate a notification to one or more peers that do not have access to the selected activity, the notification providing an option to obtain access to the selected activity;

receive a selection to obtain access to the selected activity from the one or more peer; and add the one or more peers to the multiuser session.

17. The system of claim 16, wherein the notification providing the option to obtain access to the selected activity includes at least one option of purchasing the selected activity or demoing the selected activity.

18. The system of claim 16, wherein the user profile includes multiuser activities available to the user and each peer profile includes multiuser activities available to each peer, and wherein the processor filters the multiuser activities based on one or more multiuser activities that are available to the user and each peer.

19. The system of claim 18, wherein the processor filters the multiuser activities based on at least one of a skill level of the user and each of the one or more peers.

20. The system of claim 19, wherein the processor executes further instructions to:

add a new peer to the initial session, the new peer having a new peer profile; and re-filter the multiuser activities based on the user profile, each peer profile, and the new peer profile.

21. The system of claim 12, wherein the initial session is one of a social session or another multiuser session.

22. A non-transitory computer-readable medium having embodied thereon a program executable by a processor to perform a method for initiating a multiuser session, the method comprising:

storing a plurality of multiuser activities and a plurality of activity templates, each activity template associated with each of the multiuser activities, each activity template associated with a portion of an interactive content title;

receiving a user profile for a user and a peer profile for each of one or more peers, the user profile and each of the peer profiles having information about the user and each peer with respect to each multiuser activity, wherein the user and the one or more peers are members of an initial session initiated by a platform server;

filtering the plurality of multiuser activities based on the user profile during the initial session initiated by the platform server;

receiving a user selection during the initial session initiated by the platform server, the user selection from the user specifying one of the filtered multiuser activities, wherein a retrieved activity template associated with the selected activity provides activity requirements required to launch the selected activity;

establishing a multiuser session with at least one of the peers from the initial session in response to the user selection, the multiuser session established by an interactive content server in accordance with session requirements that include at least the activity requirements provided by the retrieved activity template; and launching the selected activity in the multiuser session established by the interactive content server, the selected activity launched with the at least one peer.

* * * * *